United States Patent [19]

Busse et al.

[11] Patent Number: 5,211,731
[45] Date of Patent: May 18, 1993

[54] PLASMA CHEMICAL VAPOR DEPOSITION OF HALIDE GLASSES

[75] Inventors: Lynda E. Busse, Lorton; Ishwar D. Aggarwal, Fairfax Station, both of Va.; Kenneth J. Ewing, Bowie; Barry B. Harbison, Clinton, both of Md.

[73] Assignee: The United States of Americas as represented by the Secretary of the Navy, Washington, D.C.

[21] Appl. No.: 722,447

[22] Filed: Jun. 27, 1991

[51] Int. Cl.$^5$ .................. C03B 37/18; C03B 19/03
[52] U.S. Cl. ........................................... 65/3.12
[58] Field of Search ............... 65/DIG. 16, 3.12, 60.7

[56] References Cited

U.S. PATENT DOCUMENTS

| | | | |
|---|---|---|---|
| 4,145,456 | 3/1979 | Kuppers et al. | 427/38 |
| 4,378,987 | 4/1983 | Miller | 65/3.12 |
| 4,610,708 | 9/1986 | Sarhangi et al. | 65/3.12 |
| 4,627,865 | 12/1986 | Roba | 65/3.12 |
| 4,645,529 | 2/1987 | Bocko | 65/18.1 |
| 4,657,575 | 4/1987 | Roba | 65/3.12 |
| 4,659,355 | 4/1987 | Maze et al. | 65/3.12 |
| 4,718,929 | 1/1988 | Power et al. | 65/3.12 |
| 4,728,350 | 3/1988 | Cocito | 65/3.11 |
| 4,874,222 | 10/1989 | Vacha et al. | 350/96.34 |

FOREIGN PATENT DOCUMENTS

| | | | |
|---|---|---|---|
| 0103448 | 3/1989 | European Pat. Off. | 65/3.12 |
| 0175743 | 10/1982 | Japan | 65/DIG. 16 |

*Primary Examiner*—Robert L. Lindsay

[57] ABSTRACT

A method for producing internally coated glass tube preforms for drawing fiber optic conductors. The internally coated glass tubes are halogen coated, preferably coated with metal fluorides, so that an optical fiber formed will have a halogen core which conveys light having a wavelength of about 2 to 4 microns, which is in the infrared region, with low attenuation. With one aspect of the method, a carrier gas and a halogenated alkoxide are introduced into a glass tube which has an inner wall and which is surrounded by a resonator for producing a plasma from the halogenated alkoxide in the tube. With another aspect of the method, a blend of a carrier gas, an organometallic compound, and a halogen-containing gas are introduced into a glass tube which has an inner wall and which is surrounded by a resonator for producing a plasma. In both cases, the tube is moved relative to the resonator to form a plasma zone within the tube such that a halide coating is formed on the inner wall of the tube. The plasma generation and inner glass wall coating take place at a relatively low pressure and at a relatively low temperature.

22 Claims, 1 Drawing Sheet

PLASMA CHEMICAL VAPOR DEPOSITION OF HALIDE GLASSES

BACKGROUND OF THE INVENTION

1. Field of the Invention

The present invention described herein relates to the field of preparing preforms which are used to make optical fibers. More specifically, the invention relates to making preforms for halide glass fibers. The invention especially relates to making preforms for fluoride glass fibers.

2. Description of the Prior Art

Simple chemical vapor deposition processes are well known in the manufacture of silica fibers. More specifically, simple chemical vapor deposition process are well known in the manufacture of fluoride glass fibers for low attenuation and good transmission beyond 2 microns, that is, in the infrared range. In such processes, organometallic precursors of $BeF_2$ and $AlF_3$ are volatilized and carried by an inert gas into a silicate glass tube. There the precursors break down, yielding the fluoride products which deposit on the inner wall of the tube, while the remaining products flow out the exhaust. The fluoride materials are sintered by means of a travelling heat coil into a $BeF_2$ glass layer (forming the cladding of the preform), and a $BeF_2/AlF_3$ glass layer of slightly higher refractive index (forming the core of the preform). This preform is then drawn into an optical fiber capable of infrared transmission.

Although the simple chemical vapor deposition process yields preforms of proper stoichiometry and reasonable purity, there are a number of limitations in its use for fluoride or other halide materials due to the intrinsic characteristics of halides.

First, halide material precursors have low vapor pressures. Preform fabrication by simple chemical vapor deposition at the usual atmospheric pressures would be a slow process.

Second, halide materials generally have low softening temperatures. Once chemical vapor deposition occurs, often the material is in the form of soot or powder, and the tube must be heated to above the softening temperature so as to change the products from soot to a dense glass film. Since the deposition tube is also likely to be made of low melting halide glass, it may soften and lose its shape during this process.

Third, most halide glasses consist of several components. With simple chemical vapor deposition methods, after each component precursor is carried by inert gas to the deposition tube, conditions for deposition must be chosen such that the resulting deposited layer contains the proper mixture to form the desired halide composition. Such a process would certainly be difficult for a typical six-component halide glass composition.

Fourth, simple chemical vapor deposition processes are generally slow and inefficient processes. The generally poor efficiency of simple chemical vapor deposition processes would be further worsened due to inherently low deposition rates with halide materials.

Other processes are known for producing internally coated glass tubes for drawing of fiber optic light conductors. For example, in U.S. Pat. No. 4,145,456 of Kuppers et al a method of producing internally coated glass tubes for the drawing of fiber optic light conductors is disclosed. In the method, a plasma is created to coat the inside of a glass tube. The plasma is created in the presence of $SiCl_4$, oxygen, and $GeCl_4$. The coating consists of a plurality of layers of $SiO_2$ doped with an increasing content of $GeO_2$. In spite of the use of halogen-containing materials such as $SiCl_4$ and $GeCl_4$, a suitable halide glass is not disclosed as being obtained. Instead, the coating consists of a plurality of layers of $SiO_2$ doped with an increasing content of $GeO_2$. Moreover, there is no disclosure of producing a fluoride glass in the Kuppers et al patent.

In U.S. Pat. No. 4,718,929 of Power et al there is a disclosure of a vapor phase method for making a metal halide material useful for the drawing of an optical waveguide fiber. In the method, a fluorinated beta-diketonate (which is a halogenated organometallic material), e.g. $Zr(hfa)_4$ (column 3, line 47), is treated with an energy source to bring about an intramolecular fluorine transfer reaction through which metal fluorides are formed. The fluorinated beta-diketonate constitutes the principal source of both metal and halogen in the metal halide. The source of energy may be a plasma, e.g. plasma discharges at radio frequencies or microwave frequencies (column 4, lines 39-47).

It is noted that in the Power et al patent, no disclosure is provided for formation of a metal halide via in situ formation of halide from a halide-carrying gas. Furthermore, no disclosure is provided of direct formation of metal halide by exposure of fluorinated alkoxides to a plasma-generating environment.

SUMMARY OF THE INVENTION

Accordingly, it is an object of the present invention to provide a rapid process for fabrication of halide glass preforms used in making halide core optical fibers.

Another object of the invention is to provide a process for fabrication of halide glass preforms that do not produce a soot or powder that must be heated at high temperatures so as to change the products from soot to glass.

Still another object of the invention is to provide a simple deposition process that is suitable for use with a number of individual deposition ingredients.

Yet another object is to provide a relatively rapid and efficient deposition process for providing halide glasses, especially fluoride glasses which have low attenuation and good transmission in the infrared range.

Briefly, these and other objects are accomplished by a novel method of the invention for producing internally coated glass tubes for drawing fiber optic conductors. In accordance with one aspect of the method of the invention, a carrier gas and a halogenated alkoxide are introduced into a glass tube which has an inner wall and which is surrounded by a resonator for producing a plasma from the halogenated alkoxide in the tube. The tube is moved relative to the resonator to form a plasma zone within the tube such that a halide coating is formed on the inner wall of the tube. The plasma generation and inner glass wall coating take place at a relatively low pressure and at a relatively low temperature.

In accordance with another aspect of the invention, another method for producing internally coated glass tubes for drawing fiber optic conductors is provided. With the method, a blend of a carrier gas, an organometallic compound, and a halogen-containing gas are introduced into a glass tube which has an inner wall and which is surrounded by a resonator for producing a plasma. Then, the tube is moved relative to the resonator to form a plasma zone within the tube to form a halide coating on the inner wall of the tube.

Other objects, advantages and novel features of the invention will become apparent from the following detailed description of the invention when considered in conjunction with the accompanying drawings herein.

DETAILED DESCRIPTION OF THE PREFERRED EMBODIMENT

Figure 1:
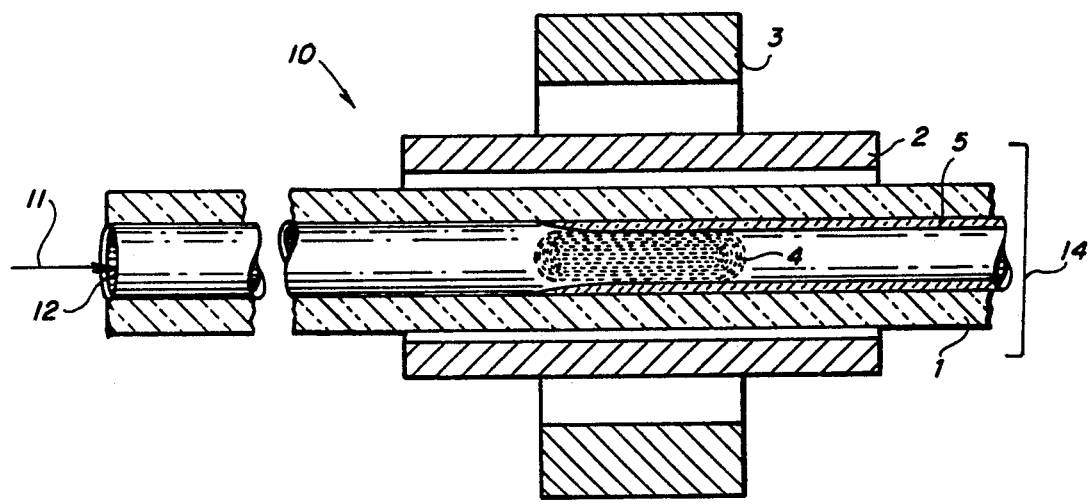
FIG. 1 shows an apparatus for carrying out the method of the invention.

With reference to FIG. 1, an apparatus 10 is shown for carrying out the method of the invention. The drawing for apparatus 10 is substantially found in U.S. Pat. No. 4,145,456 of Kuppers et al which is discussed hereinabove and is incorporated herein by reference. More specifically, with the plasma chemical vapor deposition method of the invention, a substrate glass tube 1 lies within a heating zone 2. The tube 1 is movable in the direction indicated by the arrow 11. If desired, the tube 1 may also be movable back and forth along an axis defined by the arrow 11. A movable furnace 2 is surrounded by a microwave or RF generating resonator 3. A plasma 4 (e.g. a non-isothermal plasma) is generated by the resonator 3 in gaseous material (not shown) which flows into the tube 1 from the opening 12 at the left side of FIG. 1. Exhaust gases exit from the opposite end of the tube 1.

The plasma production results in the proper metal halide products necessary to provide a halide coating 5 for the inner walls of the tube 1. Once the inner walls of the tube 1 are coated with the metal halide coating 5, a preform 14 is formed made up of the tube 1 having its inner wall coated with the metal halide coating 5. The metal halide coating 5 has a slightly higher refractive index than the refractive index of the tube 1. Thus, when the preform 14 is drawn into an optical fiber (not shown), the inner metal halide coating 5 becomes the core of the fiber. More specifically, the optical fiber produced, having the metal halide core, is capable of transmitting optical frequencies beyond 2 microns in the infrared range with low attenuation.

Formation of the metal halide coating 5 for the inner wall of the substrate tube 1 using the plasma chemical vapor deposition process of the invention can occur via two different reactions.

First, direct formation of metal halide:

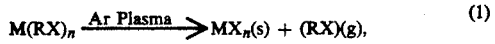

(1)

where $M(RX)_n$ is a halogenated alkoxide, the plasma employs argon as the carrier, $MX_n$ is a solid metal halide, and RX are exhaust gases.

Second, formation of a metal halide via in situ formation of halide from a halogen-containing gas, for example $SF_6$, $CF_4$, $NF_3$ or $F_2$. This scheme is illustrated below, in an exemplary manner, for the case where the halogen-containing gas is $NF_3$:

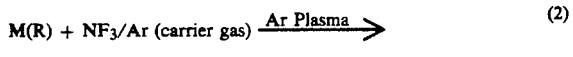

(2)

where M(R) is an organometallic compound which may or may not contain fluorine, $NF_3$ is nitrogen trifluoride, the plasma employs argon as the carrier, $MF_n$ is a solid metal fluoride, and $nCF_n$ and $N_2$ are exhaust gases.

In reaction (1) it is necessary to use a halogenated alkoxide. At the high temperatures of the plasma, the halogenated alkoxide spontaneously breaks down into solid metal halide and gaseous waste products. This method requires no hazardous gases to be used in the process.

With reaction (2), either a halogenated or a non-halogenated organometallic compound can be used to form the metal halide. Here the carrier gas is a mixture of argon and a high temperature halogenating agent such as the fluorinating agent $NF_3$. The $NF_3$ breaks down in the plasma forming fluorine which then fluorinates the metal. This method allows for carbon removal via formation of volatile fluorocarbons which are carried out of the reaction zone in the vapor state.

Table I below lists suitable organometallic compounds, which do not contain halide, which react with a halogen-containing gas in a plasma to result in the production of metal halides which coat the inner walls of substrate glass tubes.

TABLE I

A. Metal Alkyls
  1. Tetraneopentylzirconium
  2. Triethylaluminum (TMA)
B. Cyclopentadienyls
  1. Bis(cyclopentadienyl)dimethylzirconium (IV) $(CPD)_2Me_2$
  2. Bis(pentamethylcyclopentadienyl)barium $(PMC)_2$
C. Metal Alkoxides
  1. Aluminum isopropoxide
  2. Zirconium isopropoxide Table II below lists fluorinated alkoxides which provide metal fluorides when exposed to a plasma-generating environment.

TABLE II

A. Fluorinated Alkoxides
  1. Sodium perfluoro-t-butoxide (NaPFTB)
  2. Zirconium (IV) perfluoro-t-butoxide (ZrPFTB)
  3. Aluminum perfluoro-t-butoxide (AlPFTB)
  4. Sodium hexafluoro-iso-propoxide (NaHFIP)
  5. Zirconium hexafluoro-iso-propoxide (ZrHFIP)
  6. Aluminum hexafluoro-iso-propoxide (AlHFIP)

The process of the present invention may be used to include metal halides of any metal useful in halide glass compositions. Typically, these metals include Zr, Ba, La, Al, Na, Li, In, Sn, Yt, Th, Ga, Pb, Hf, Zn, Zn, and Cd. The present invention is useful when the halide component of that metal halide is any halide used in halide glass compositions, such as fluoride or chloride. Typically, the present invention is useful in the production of metal fluoride glasses.

Presented below are some examples of employing the principles of the invention in conjunction with an apparatus similar to the apparatus disclosed in U.S. Pat. No. 4,145,456 mentioned above and incorporated herein by reference.

EXAMPLES

Example 1

A gas mixture consisting of Ar, $NF_3$, $Zr(CPD)_2Me_2$, and $Ba(PMC)_2$ was passed through a quartz tube 1 (length 14 cm, outer diameter 1.4 cm, and inner diameter 0.8 cm) at a throughput of 100 sccm and maintaining a pressure of 1 millitorr. The mixture consisted of 25%

Ar, 25% NF$_3$, 35% Zr(CPD)$_2$Me$_2$, and 15% Ba(PMC)$_2$. The wall temperature was kept at 200 degrees Centigrade. The tube 1 was passed at a speed of 100 cm/min through the apparatus comprised of heating device 2 having a length of 10 cm and a resonator 3 having a length of 1.5 cm, while a plasma 4 was produced by a 2.45 GHz generator. A 70 ZrF$_4$—30 BaF$_2$ glass coating having a thickness of 0.05 cm was formed directly on the inner wall of the tube 1.

Example 2

A gas mixture consisting of Ar, NF$_3$, Zr(PFTB), Ba(PMC)$_2$, La(FOD), Al(HFIP), and Na(PFTB) was passed through a fluoride glass tube 1 (length 14 cm, outer diameter 1.4 cm, and inner diameter 0.8 cm) at a throughput of 250 sccm and maintaining a pressure of 1.5 millitorr. The mixture consisted of 25% Ar, 25% NF$_3$, 27% Zr(PFTB), 10% Ba(PMC)$_2$, 2% La(FOD), 2% Al(HFIP), and 9% Na(PFTB). The wall temperature was kept at 200 degrees Centigrade. The tube 1 was passed at a speed of 100 cm/min through the apparatus comprised of heating device 2 having a length of 10 cm and a resonator 3 having a length of 1.5 cm, while a plasma 4 was produced by a 2.45 GHz generator. A 54 ZrF$_4$—20 BaF$_2$—4 LaF$_3$—4 AlF$_3$—18 NaF glass coating having a thickness of 0.01 cm was formed directly on the inner wall of the tube 1.

The plasma chemical vapor deposition method of the invention provides a number of advantages for providing metal halide coatings for the inner walls of glass tubes. Such advantages include the following.

First, with the method of the invention, the metal halide deposition occurs at low pressures. Since the organometallic precursors have relatively low vapor pressure, the deposition process carried out under low pressure will proceed speedily.

Second, with the method of the invention, the metal halide deposition takes place at a relatively low temperature. The low temperature process is especially beneficial for low melting halide materials since the deposition process can occur without melting or deforming the substrate tube.

Third, with the method of the invention, the plasma reaction occurs simultaneously for all species used for coating the substrate tube. This aspect of the invention aids in the mixing of a plurality of coating components and aids in a uniform deposition of the plurality of coating components onto the inner wall of the substrate tube.

Four, there is a nearly 100% efficiency in the reaction. That is, nearly 100% of the precursors are transformed into coating components in the plasma method of the invention. This improved efficiency aids in rapid deposition of the low vapor pressure halide materials, with less material escaping out the exhaust.

Although the embodiments of the invention described thus far relate to producing a fluoride-containing coating on the inner wall of a substrate tube, the method of the invention can be used for coating glass substrate walls with other halides such as chloride, bromide, and iodide.

Furthermore, specific details as to operating pressures, operating frequencies, furnace temperatures, rates of travel of the furnace generator along the deposition tube, and other details depend on specific details relating to the halogen-containing precursors, the internal diameter of the substrate tubing, and the thickness of the halide coating to be deposited on the inner wall of the substrate tubing, in addition to other factors.

More specifically, however, it is contemplated that the operating pressures are typically in the range of 0.1 to 100 Torr, preferably 1 to 10 Torr, operating frequencies are typically in the range of 10 MHz to 10 GHz, furnace temperatures are typically in the range of 100° to 400° C., preferably 25° to 275° C. (glass transition temperature, $T_g$, or below), and rates of travel of the furnace generator along the deposition tube are typically in the range of 0.1 to 500 cm/min. Also, the carrier gas, the organometallic compound, and the halogen-containing gas, or the carrier gas and halogenated alkoxide, are typically introduced into the glass tube at a temperature of about 25° to 250° C., more typically at 150° to 200° C.

Also, more specifically, it is contemplated that the internal diameter of the substrate tubing is typically in the range of 0.5 to 5.0 cm, and that the thickness of the halide coating to be deposited on the inner wall of the substrate tubing is typically in the range of 0.005 to 0.5 cm.

It will be understood that various charges in the details, steps and arrangement of parts which have been herein described and illustrated to explain the nature of the invention, may be made by those skilled in the art within the principles and scope of the invention as expressed in the appended claims.

What is claimed is:

1. A method of producing glass tubes internally coated with a glass composition comprising a ZrF$_4$, BaF$_2$, LaF$_3$, AlF$_3$ and NaF in a predetermined ratio for drawing fiber optic conductors of said glass composition, comprising the steps of:

introducing a carrier gas and said Zr, Ba, La, Al and Na of said glass composition in the form of plasma chemical vapor deposition precursors for said glass composition selected from the group consisting of halogenated alkoxides and non-halogenated organometallic compounds, into a glass tube having an inner wall and surrounded by a resonator, at least one of said Zr, Ba, La, Al and Na of said glass composition being introduced as a halogenated alkoxide, and moving the tube relative to the resonator to form a plasma zone within the tube to form a coating of said glass composition on the inner wall of the tube.

2. The method described in claim 1 wherein the carrier gas is argon.

3. The method described in claim 1 wherein the carrier gas and the plasma chemical vapor deposition precursors are introduced into the glass tube at a pressure of about 0.1 to 100 Torr.

4. The method described in claim 3 wherein the carrier gas and the plasma chemical vapor deposition precursors are introduced into the glass tube at a pressure of about 1 to 10 Torr.

5. The method described in claim 1 wherein the carrier gas and the plasma chemical vapor deposition precursors are introduced into the glass tube at a temperature of about 25° to 250° C.

6. The method described in claim 5 wherein the carrier gas and the plasma chemical vapor deposition precursors are introduced into the glass tube at a temperature of about 150° to 200° C.

7. The method described in claim 1 wherein the plasma is a nonisothermal plasma.

8. The method described in claim 1, further including the step of heating the tube to a temperature of between about 100° and about 400° C.

9. The method described in claim 1 wherein the halogenated alkoxide is a fluorinated alkoxide.

10. The method described in claim 9 wherein the fluorinated alkoxide is selected from the group consisting of sodium perfluoro-t-butoxide, zirconium (IV) perfluoro-t-butoxide, and aluminum perfluoro-t-butoxide, sodium hexafluoro-iso-propoxide, zirconium hexafluoro-iso-propoxide and aluminum hexafluoro-iso-propoxide.

11. A method of producing glass tubes internally coated with a glass composition comprising $ZrF_4$, $BaF_2$, $LaF_3$, $AlF_3$ and $NaF$ in a predetermined ratio for drawing fiber optic conductors of said glass composition, comprising the steps of:

introducing a carrier gas, a halogen-containing gas, and said Zr, Ba, La, Al and Na of said glass composition in the form of plasma chemical vapor deposition precursors for said glass composition selected from the group consisting of halogenated alkoxides and non-halogen-containing organometallic compounds, into a glass tube having an inner wall and surrounded by a resonator, at least one of said Zr, Ba, La, Al and Na of said glass composition being introduced as a non-fluorinated organometallic compound, and moving the tube relative to the resonator to form a plasma zone within the tube to form a coating having said glass composition on the inner wall of the tube.

12. The method described in claim 11 wherein the carrier gas is argon.

13. The method described in claim 11 wherein the carrier gas, the plasma chemical vapor deposition precursors, and the halogen-containing gas are introduced into the glass tube at a pressure of about 0.1 to 100 Torr.

14. The method described in claim 13 wherein the carrier gas, the plasma chemical vapor deposition precursors, and the halogen-containing gas are introduced into the glass tube at a pressure of about 1 to 10 Torr.

15. The method described in claim 11 wherein the carrier gas, the plasma chemical vapor deposition precursors, and the halogen-containing gas are introduced into the glass tube at a temperature of about 25° to 250° C.

16. The method described in claim 15 wherein the carrier gas, the plasma chemical vapor deposition precursors, and the halogen-containing gas are introduced into the glass tube at a temperature of about 150° to 200° C.

17. The method described in claim 11 wherein the plasma is a non-isothermal plasma.

18. The method described in claim 11, further including the step of heating the tube to a temperature between about 100° to about 400° C.

19. The method described in claim 18, further including the step of heating the tube to a temperature between about 225° to about 275° C.

20. The method described in claim 11 wherein the halogen-containing gas is $NF_3$, $CF_6$, $CF_4$ or $F_2$.

21. The method described in claim 11 wherein the non-halogen-containing organometallic compound is selected from the group consisting of metal alkyls, cyclopentadienyls, and metal alkoxides.

22. The method described in claim 11 wherein the non-halogen-containing organometallic compound is selected from the group consisting of tetraneopentylzirconium, triethylaluminum, bis(cyclopentadienyl)dimethylzirconium (IV), bis(pentamethylcyclopentadienyl)barium, and aluminum isopropoxide.

* * * * *